(12) United States Patent
Fan et al.

(10) Patent No.: US 7,193,855 B2
(45) Date of Patent: Mar. 20, 2007

(54) COMPUTER ENCLOSURE WITH FASTENING DEVICE

(75) Inventors: Chen-Lu Fan, Tu-Chen (TW); Li-Ping Chen, Tu-Chen (TW); Kuo-Chih Lin, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 263 days.

(21) Appl. No.: 10/898,064

(22) Filed: Jul. 23, 2004

(65) Prior Publication Data
US 2005/0023023 A1 Feb. 3, 2005

(30) Foreign Application Priority Data
Jul. 23, 2003 (TW) .............................. 92213445 U

(51) Int. Cl.
*H05K 5/02* (2006.01)
(52) U.S. Cl. .................... 361/724; 312/223.2; 720/646; 301/724
(58) Field of Classification Search ........ 361/679–687, 361/724–727; 312/223.1–223.6; 720/646, 720/647; 301/724
See application file for complete search history.

(56) References Cited

U.S. PATENT DOCUMENTS

| 6,904,606 | B2 * | 6/2005 | Inoue et al. ................ 720/646 |
| 2005/0013105 | A1 * | 1/2005 | Lin et al. .................... 361/683 |
| 2005/0017608 | A1 * | 1/2005 | Lin et al. ................. 312/223.2 |

FOREIGN PATENT DOCUMENTS

TW    386613    4/2000

* cited by examiner

Primary Examiner—Hung Van Duong
(74) Attorney, Agent, or Firm—Wei Te Chung

(57) ABSTRACT

A computer enclosure includes a cage (10), a side panel (20) and a fastening device (100). The fastening device includes a cover (40) attached to the side panel, an actuator (60), a locking member (70), and a coil spring (50). The cover includes an end plate (43) having an aperture (46) and a base (41) having a through hole (47). The actuator includes a shaft (65). The locking member includes a cantilever arm (74) and lock block (73) having a wedge (75). The actuator is slidably received in the cover with the shaft fixing the coil spring therearound and extending through the aperture. The locking member is located in the cover, the wedge is extendable into the through hole of the base. The actuator can drive the wedge upwardly and downwardly to engage with the cage for releasing and securing the side panel from and to the cage.

13 Claims, 6 Drawing Sheets

COMPUTER ENCLOSURE WITH FASTENING DEVICE

BACKGROUND OF THE INVENTION

1. Field of the Invention

The present invention relates to a computer enclosure, and in particular to a computer enclosure having a fastening device for readily securing a side panel to the computer enclosure and detaching the side panel therefrom.

2. Related Art

Many different means are used to secure side panels to computer enclosures. One conventional means is to simply screw a side panel directly to a computer enclosure. However, this requires a screwdriver. Installation and removal of the side panel is unduly cumbersome and time-consuming.

As computers have proliferated and improved, various fastening means have been developed to facilitate installation and removal of side panels. One means of fastening is shown in Taiwan Patent Application No. 87213422. Locking means thereof comprises a plurality of hooks inwardly formed from a flange of one side of a side panel of a computer casing, for engaging in corresponding slots defined in a rear panel of the computer casing. An opposite side of the side panel forms an L-shaped flange. A plurality of apertures is defined in the L-shaped flange, for extension of screws thereinto. Because screws are needed to fix the side panel to the computer casing, installation and removal of the side panel is still unduly cumbersome and time-consuming.

An improved fastening device for securing a side panel to a computer enclosure which overcomes the above-mentioned problems is desired.

SUMMARY OF THE INVENTION

Accordingly, an object of the present invention is to provide a computer enclosure having a fastening device for readily securing a side panel to the computer enclosure and readily detaching the side panel therefrom.

To achieve the above-mentioned object, a computer enclosure of present invention includes a cage, a side panel and a fastening device for securing the side panel to the cage. The fastening device includes a cover, an actuator, a locking member, and a coil spring. The cover includes an end plate defining an aperture therein and a base defining a through hole therein. The actuator includes a shaft. The locking member includes a cantilever arm and a lock block having a wedge. The cover is attached to the side panel. The actuator is slidably received in the cover with the shaft fixed the coil spring therearound and extending through the aperture. The locking member is located in the cover with the wedge protruding down through the through hole. The actuator can drive the lock member upwardly and downwardly to engage with the cage for releasing or securing the side panel from and to the cage.

Other objects, advantages and novel features of the present invention will be drawn from the following detailed description of a preferred embodiment of the present invention with attached drawings, in which:

DESCRIPTION OF THE PREFERRED EMBODIMENT

Figure 1:
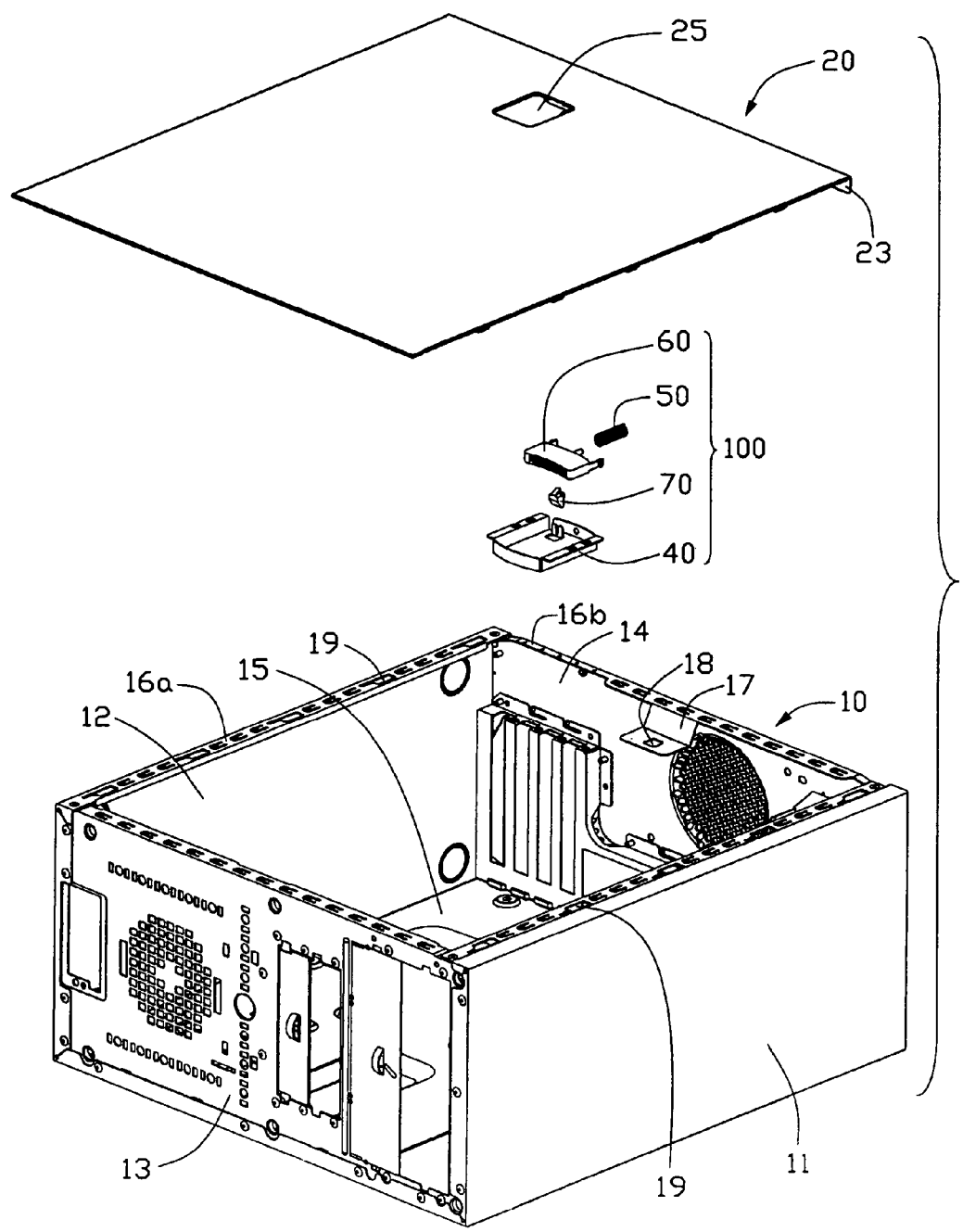
FIG. 1 is an exploded, isometric view of a fastening device of the present invention, together with a cage and a side panel.

Referring to FIG. 1, a computer enclosure of the present invention comprises a cage 10, a aide panel 20, and a fastening device 100. The side panel 20 is attached to the cage 10 via the fastening device 100. The fastening device 100 comprises a cover 40, an actuator 60, a spring 50 and a locking member 70, which together form a first latching section fixed to the inside of the side panel 20.

The cage 10 comprises a bottom wall 12, a top wall 11, a front wall 13, a rear wall 14, and a side wall 15, all of which together define a cavity therebetween. A pair of flanges 16a extends toward each other from the bottom wall 12 and the top wall 11, respectively. A pair of flanges 16b extends toward each other from the front wall 13 and the rear wall 14, respectively. A first engagement section such as a generally L-shaped resilient strip 17 corresponding to the first latching section, is formed inwardly from an edge of the flange 16b of the rear wall 14. A second engagement section such as a plurality of slits 19, is defined in each flange 16a. A through hole 18 is defined in the resilient strip 17.

Figure 2:
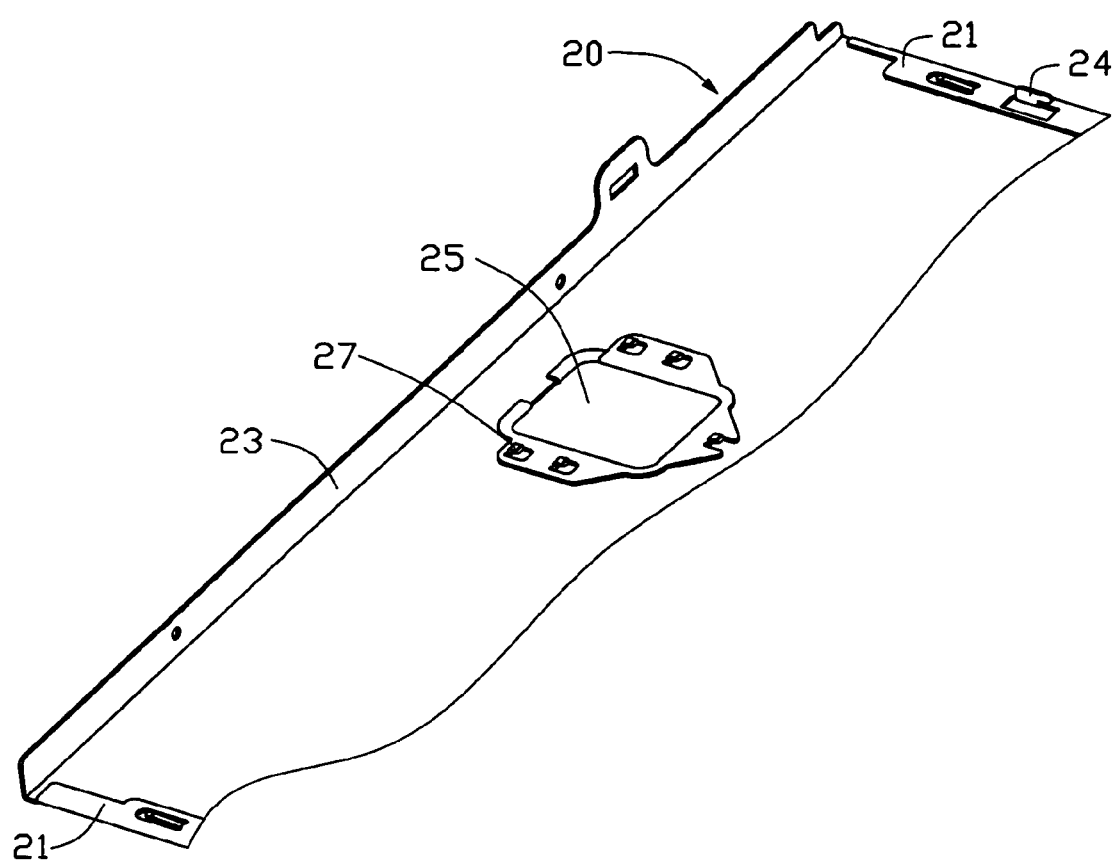
FIG. 2 is an enlarged, isometric view of part of the side panel of FIG. 1, but showing the side panel inverted from FIG. 1.

Referring also to FIG. 2, the side panel 20 comprises a pair of opposite folded rims 21 corresponding to the flanges 16a of the cage 10, and a vertical rim 23 corresponding to the flange 16b of the rear wall 14 of the cage 10. A second latching section such as a plurality of catches 24, extends perpendicularly downwardly from each folded rim 21, for engaging in the corresponding slits 19 of the flanges 16a of the cage 10. An opening 25 is defined in the side panel 20 near the vertical rim 23. A plurality of hooks 27 extends downwardly from an inner surface of the side panel 20 at opposite sides of the opening 25.

Figure 3:
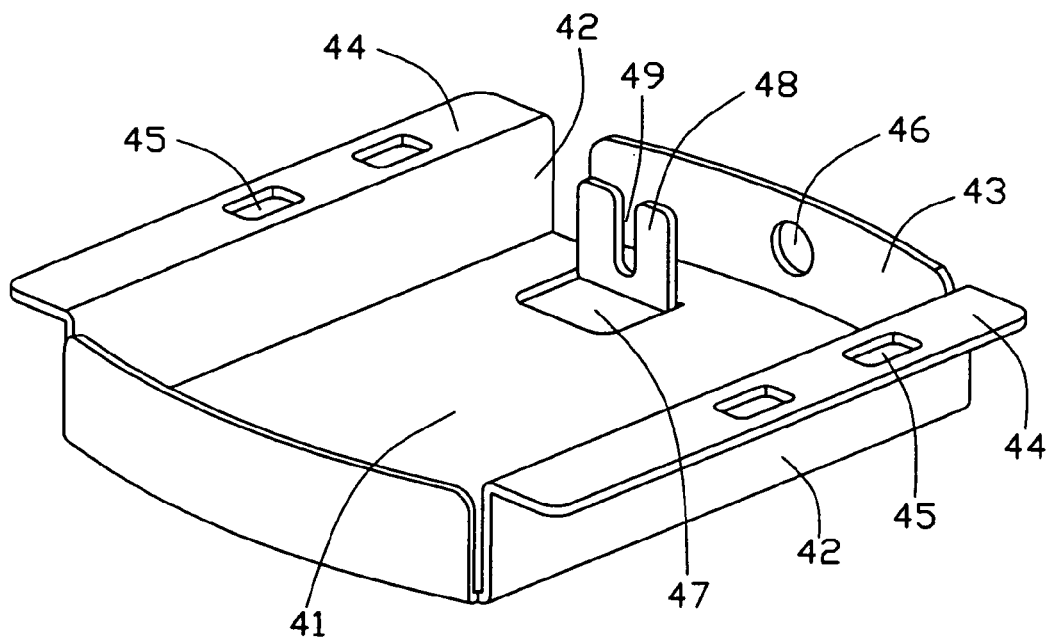
FIG. 3 is an enlarged view of a cover of the fastening device of FIG. 1.

Referring also to FIG. 3, the cover 40 comprises a base 41, and a pair of opposite side plates 42 and an end plate 43 extending upwardly from the base 41. A pair of wings 44 extends outwardly from top edges of the side plates 42 respectively. A pair of spaced slots 45 is defined in each wing 44, for engagingly retaining the hooks 27 of the side panel 20. A through aperture 46 is defined in the end plate 43. A rectangular through hole 47 is defined in the base 41. A locating plate 48 extends upwardly from the base 41 at one edge of the opening 25 nearest to the end plate 43. The locating plate 48 is parallel to the end plate 43, and defines a groove 49 therein.

Figure 4:
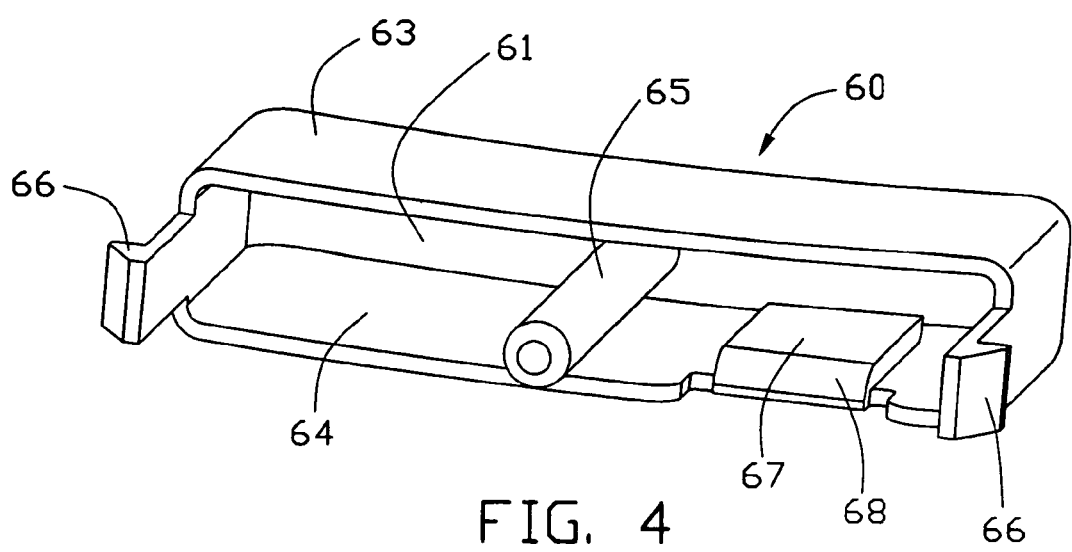
FIG. 4 is an enlarged view of an actuator of the fastening device of FIG. 1, but viewed from another aspect.

Referring also to FIG. 4, the actuator 60 is generally a hollow parallelepiped body with one open face. The actuator 60 comprises a concave end 61, a top portion 63, a bottom portion 64, a pair of clasps 66 extending from opposite sides of the concave end 61 respectively, and a shaft 65 extending from a middle of the concave end 61. A pushing block 67 is formed on an inside of the bottom portion 64. A slanted face 68 is formed on an outer side of the block 67. An outer wall of the concave end 61 has a roughened surface, to facilitate manual operation thereof.

Figure 5:
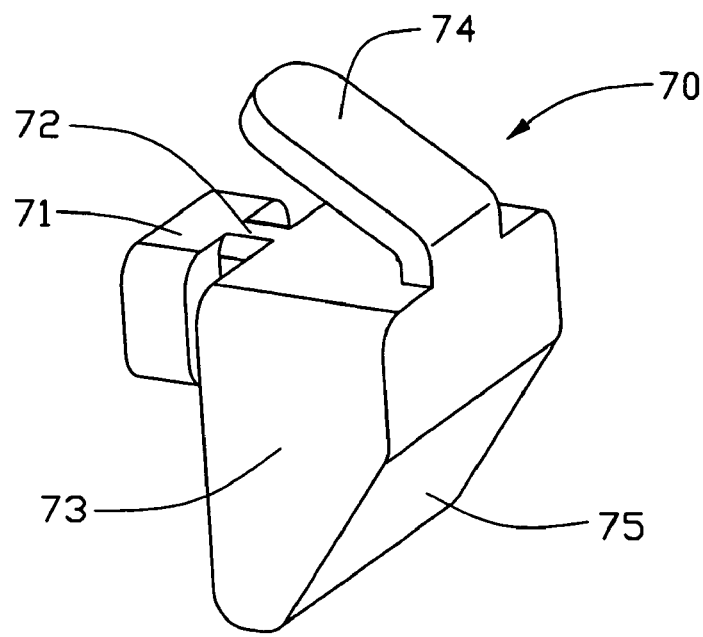
FIG. 5 is an enlarged view of a locking member of the fastening device of FIG. 1, but viewed from another aspect.

Referring also to FIG. 5, the locking member 70 is integrally formed, and comprises a locking block 73, a resilient cantilever arm 74 and a stop 71. The stop 71 is connected to the locking block 73 via a narrowed neck 72. A wedge 75 is defined at a bottom portion of the locking block 73. The resilient cantilever arm 74 extends obliquely upwardly from a top of the locking block 73 opposite from the stop 71, and can be rotatingly pressed toward the locking block 73.

Figure 6:
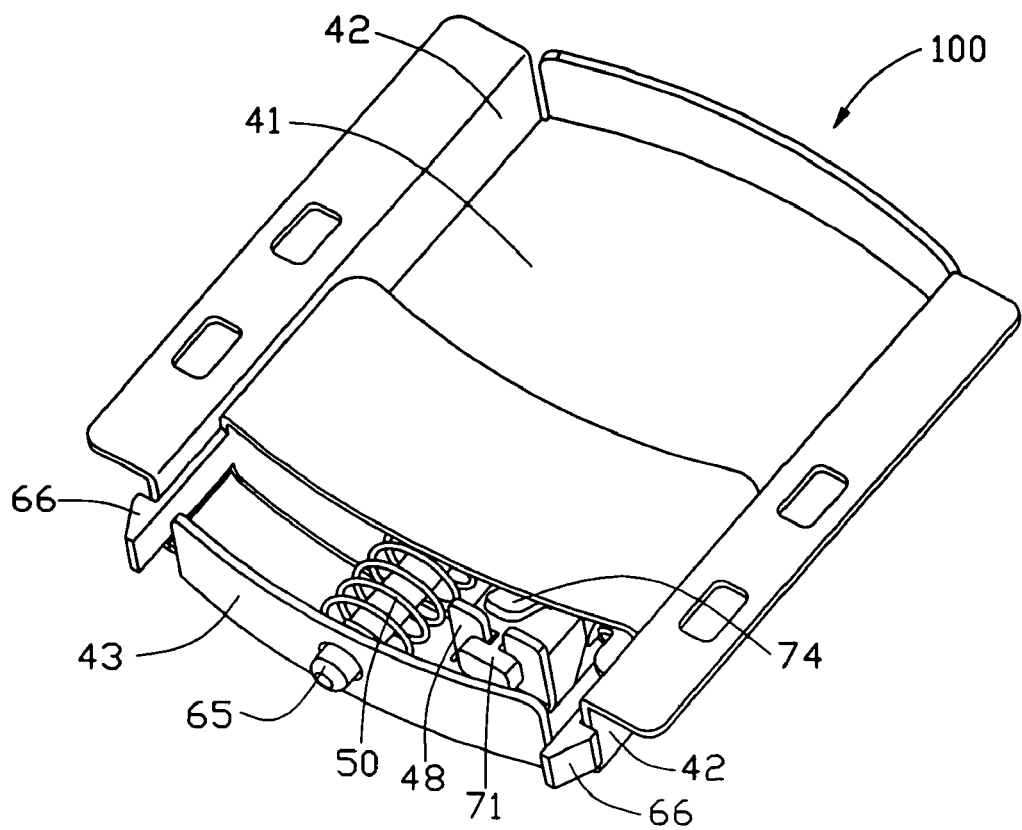
FIG. 6 is an enlarged, assembled view of the fastening device of FIG. 1, but viewed from another aspect.

Referring also to FIG. 6, in assembling the fastening device 100, the locking member 70 is attached to the base 41 of the cover 40. The neck 72 is slidably received in the groove 49 of the locating plate 48. The wedge 75 of the locking block 73 protrudes down through the through hole 47 of the cover 40. The coil spring 50 is placed around the shaft 65. The actuator 60 is slidably disposed in the cover 40, with the shaft 65 extending through the through aperture 46 of the end plate 43. The clasps 66 are releasably engaged with rear ends of the side plates 42. The top portion 63 and the pushing block 67 of the actuator 60 respectively abut against the resilient cantilever arm 74 and the wedge 75 of the locking block 73.

Figure 7:
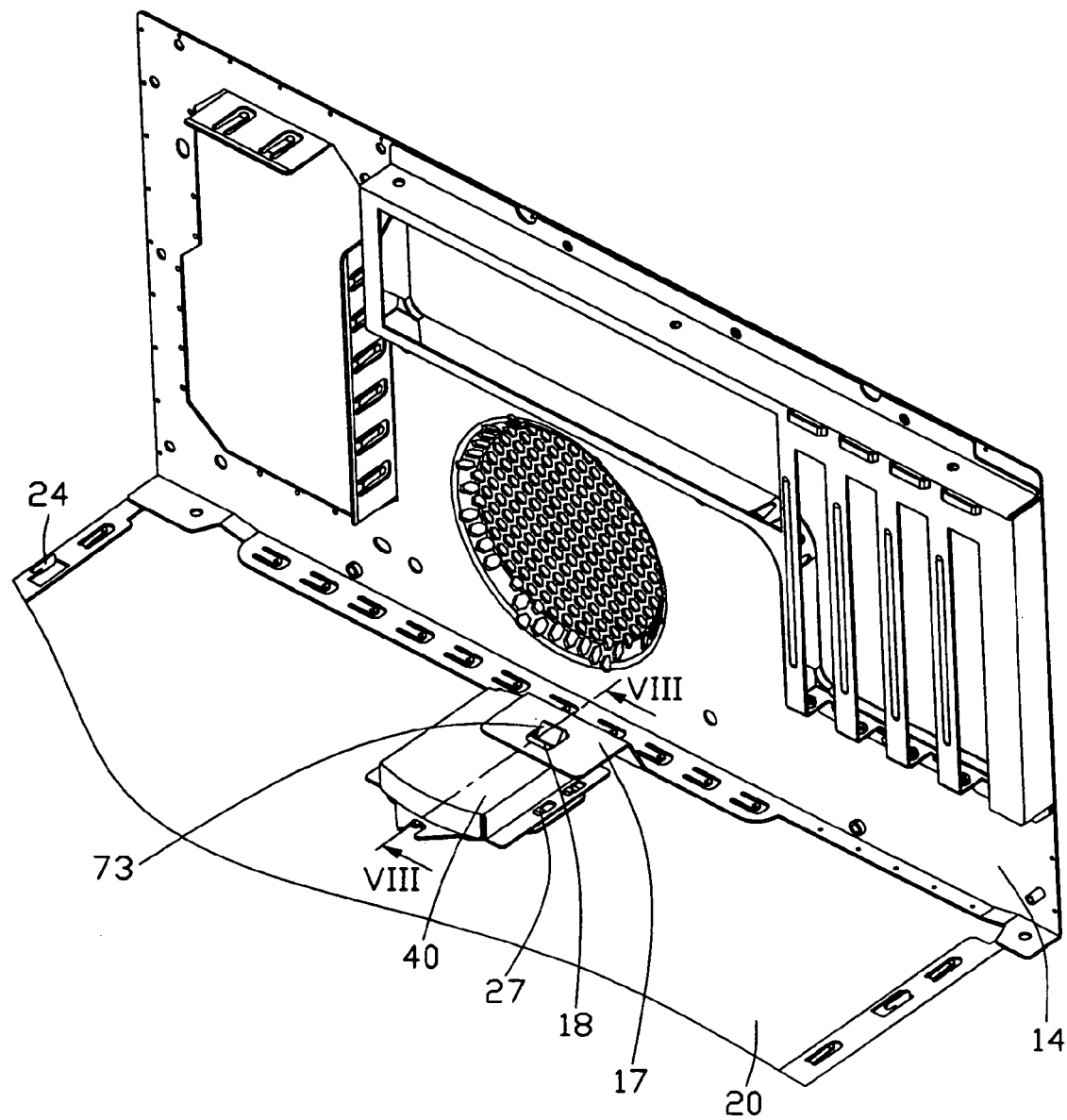
FIG. 7 is an assembled view of the fastening device, part of the side panel and a rear wall of the cage of FIG. 1, but showing these components inverted from FIG. 1.
Figure 8:
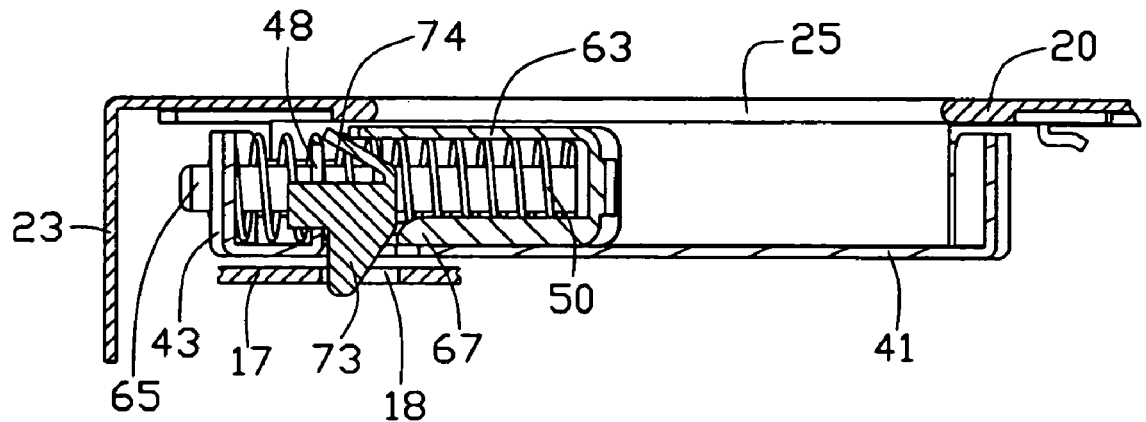
FIG. 8 is a cross sectional view taken along line VIII—VIII of FIG. 7, but showing said components in a normal non-inverted orientation, and showing the fastening device in a locked state.

Referring also to FIG. 7, the fastening device 100 is attached to the side panel 20. The hooks 27 of the side panel 20 are engaged in the slots 45 of the cover 40. Then the side panel 20 is attached to the cage 10, with the catches 24 engaging in the slits 14 of the cage 10. Referring also to FIG. 8, the wedge 75 of the locking member 70 protrudes down through the through hole 18 of the bracket 17 of the cage 10. The side panel 20 is thus secured to the cage 10 by the fastening device 100. In this locked state, the coil spring 50 is slightly compressed, the clasps 66 are releasably engaged with the rear ends of the side plates 42, and the actuator 60 exerts no force on the locking member 70.

Figure 9:
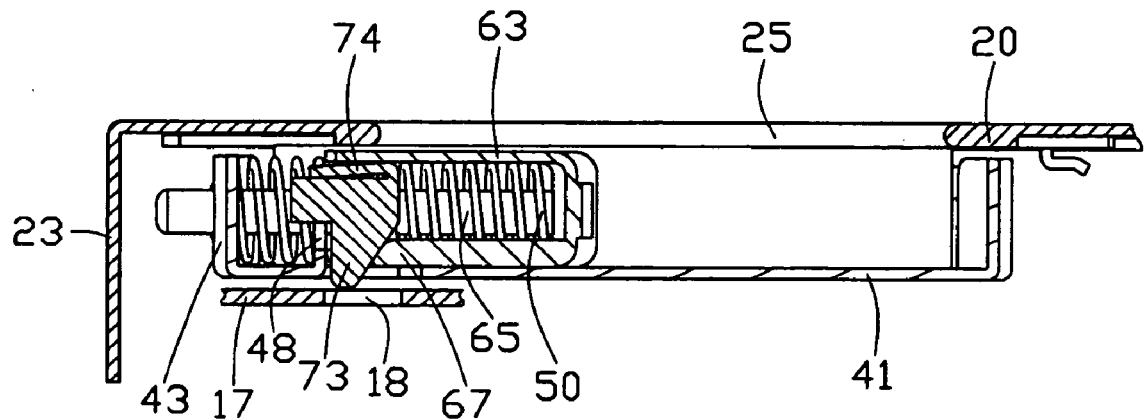
FIG. 9 is similar to FIG. 8, but showing the fastening device in an unlocked state.

Referring also to FIG. 9, the side panel 20 can be detached from the cage 10 only by releasing the fastening device 100 from the cage 10. The concave end 61 of the actuator 60 is pressed rearward, so that the top portion 63 of the actuator 60 drives the cantilever arm 74 downwardly. At the same time, the pushing block 67 drives the locking member 70 upwardly so that the wedge 75 is withdrawn from the through hole 18 of the cage 10. In this unlocked state, the coil spring 50 and the cantilever arm 74 are compressed. The side panel 20 is then removed from the cage 10 by disengaging the catches 24 from the slits 14. When the pressure on the concave end 61 is released, the coil spring 50 decompresses and drives the concave end 61 of the actuator 60 forward toward its original position. The cantilever arm 74 rebounds, and drives the locking member 70 downwardly to its original position.

When the side panel 20 is attached to the cage 10, the concave end 61 of the actuator 60 is pressed rearward so that the catches 24 can be engaged in the slits 14. Attachment of the side panel 20 is essentially the reverse of the above-described detachment procedure.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to full extent indicated by the broad general meaning of the terms in which the appended claims are expressed.

The invention claimed is:

1. A computer enclosure comprising:
   a cage comprising a plurality of walls, a bracket formed at one of the walls and defining a through hole therein;
   a side panel attached to the cage; and
   a fastening device attached to the side panel, the fastening device comprising a cover attached to the side panel, an actuator slidably received in the cover, a resilient element and a locking member received in the cover; wherein
   the cover comprises a base defining a through hole, and an end plate extending from the base and defining an aperture, a shaft extends from the actuator through the aperture of the plate, the resilient member comprises a cantilever arm, and a locking block extendable into the through holes of the base and the bracket; and
   the actuator is slidable in a first direction such that it drives the locking member upwardly wherein the locking block withdraws from the through hole of the bracket whereby the side panel is releasable from the cage, and in a second direction such that the resilient member drives the actuator away from the locking member wherein the locking block extends into the through hole of the bracket whereby the side panel is secured to the cage.

2. The computer enclosure as described in claim 1, wherein the cage comprise a pair of flanges defining a plurality of slits therein, the side panel comprises a pair of rims forming a plurality of catches, and the catches are engaged in the slits.

3. The computer enclosure as described in claim 1, wherein the side panel defines an opening therein and forms a plurality of hooks around the opening, the cover comprises a pair of side plates and a pair of wings extending from the side plates, each of the side wings defines a plurality of slots, and the cover is attached to the side panel at the opening, with the hooks engaging in the slots.

4. The computer enclosure as described in claim 1, wherein the actuator comprises a concave end, a top portion, a bottom portion, and a pair of clasps extending from opposite sides of the concave end.

5. The computer enclosure as described in claim 4, wherein the bottom portion forms a pushing block, and a slanted face is formed on an outer side of the pushing block.

6. The computer enclosure as described in claim 5, wherein the cover comprises a locating plate extending from the base at one edge of the through hole, a groove is defined in the locating plate, the actuator comprise a stop and a neck connecting the stop to the locking block, and the neck is received in the groove.

7. A fastening device adapted to be attached to a side panel for securing the side panel to a computer cage, comprising:
   a cover adapted to be attached to the side panel, the cover comprising a base and an end plate extending from the base, the base defining a through hole, the end plate defining an aperture;
   an actuator received in the cover and slidable in a first direction, the actuator comprising a shaft extending through the aperture of the end plate, and a pushing block having a stained outer surface;

a locking member disposed at the base of the cover corresponding to the through hole, and slidable in a second direction perpendicular to the first direction, the locking member comprising a locking block, and a cantilever arm corresponding to the cover, the locking block forming a wedge at a bottom thereof adapted to engage with the cage; and a resilient member disposed around the shaft between the actuator and the end plate; wherein when the actuator is pushed in the first direction, the resilient member is compressed, the actuator compresses the cantilever arm, the pushing block of the actuator drives the locking member to move in the second direction, and the wedge of the locking block withdraws such that the fastening device is releasable from the cage; and when the actuator is released, the resilient member decompresses to drive the actuator in a third direction opposite to the first direction, the cantilever arm decompresses and drives the wedge in a fourth direction opposite to the second direction such that the wedge is engagable with the cage.

8. The fastening device as described in claim 7, wherein the cover further comprises a pair of side plates extending from the base, and a pair of wings extending from each the side plate, each of the wings defines a plurality of slots for engagingly the cover with the side panel.

9. The fastening device as described in claim 8, wherein the cover further comprises a locating plate extending from the base at one edge of the through hole, the locating plaza defines a groove, the actuator comprise a stop and a neck connecting the stop to the locking block, the neck is received in the groove.

10. The fastening device as described in claim 9, wherein the actuator comprises a concave end, a top portion, a bottom portion and a pair of clasps extending from opposite sides of the concave end.

11. The fastening device as described in claim 10, wherein the clasps are releasably engaged with the side plates of the cover.

12. The fastening device as described in claim 11, wherein the pushing block is provided on an inside of the bottom portion of the actuator.

13. A computer enclosure comprising:
a cage comprising a pair of side walls with a rear wall connected therebetween;
a side panel attached to the cage;
the cage including a first engagement section formed on the rear wall and a second engagement section formed on the sidewalls;
the side panel defining a first latching section corresponding to the first engagement section and a second latching section corresponding to the second engagement section;
the first latching section latchably engaged with the first engagement section in a front-to-back direction, the second latching section latchably engaged with the second engagement section in a vertical direction perpendicular to said front-to-back direction; wherein
said first latching section includes a vertically movable locking member which is directly locked by the first engagement section and is actuated by a horizontally movable actuator which is accessible from an exterior so that said locking member is allowed to be disengaged from the first engagement section.

* * * * *